United States Patent
Barbosa et al.

(10) Patent No.: US 6,367,594 B1
(45) Date of Patent: Apr. 9, 2002

(54) DISC BRAKE PRESSURE PLATE WITH ABUTMENT EARS HAVING LATERALLY DISPLACED SECTIONS

(75) Inventors: Manuel Barbosa, Novi; Scot W. Bronka, Northville, both of MI (US)

(73) Assignee: Akebono Corporation North America, Farmington Hills, MI (US)

( * ) Notice: Subject to any disclaimer, the term of this patent is extended or adjusted under 35 U.S.C. 154(b) by 0 days.

(21) Appl. No.: 09/603,594

(22) Filed: Jun. 26, 2000

(51) Int. Cl.⁷ .................. F16D 65/04; F16D 65/02
(52) U.S. Cl. ............. 188/73.1; 188/73.31; 188/250 B
(58) Field of Search ................ 188/73.1, 73.31, 188/73.35, 73.36, 73.37, 250 R, 250 B, 250 D, 250 F, 258

(56) References Cited

U.S. PATENT DOCUMENTS

| | | | |
|---|---|---|---|
| 4,227,600 A | * 10/1980 | Shirai | 192/84 C |
| 4,241,327 A | 12/1980 | Yamamoto | |
| 4,241,812 A | * 12/1980 | Burgdorf et al. | 188/73.1 |
| 4,313,527 A | * 2/1982 | Pickel | 188/73.32 |
| 4,508,199 A | * 4/1985 | Herbulot et al. | 188/250 B |
| 4,685,543 A | * 8/1987 | Ziolkowski | 188/73.1 |
| 4,878,564 A | 11/1989 | Kondo | |
| 4,890,698 A | 1/1990 | Le Deit | |
| 4,915,198 A | 4/1990 | Hirashita | |
| 4,979,293 A | * 12/1990 | Horner, Jr. | 29/888.2 |
| 5,129,487 A | * 7/1992 | Kobayashi et al. | 188/73.1 |
| 5,388,675 A | * 2/1995 | Kahr et al. | 188/250 B |
| 6,056,091 A | * 5/2000 | Krug et al. | 188/73.37 |

FOREIGN PATENT DOCUMENTS

| JP | 56147933 A | * 11/1981 |
|---|---|---|
| JP | 60143233 A | * 7/1985 |

* cited by examiner

Primary Examiner—Chris Schwartz
Assistant Examiner—Melody M. Burch
(74) Attorney, Agent, or Firm—Clark & Brody

(57) ABSTRACT

A pressure plate for a disc brake pad is provided with ears having increased thickness to ensure retention of the pad in the brake housing when the friction material is worn. The increased thickness is obtained by linearly displacing one or more sections of the ears perpendicular to the plate by stamping, and preferably by fine blanking. This process optimizes the life of the stamping tools and does not require subsequent machining.

3 Claims, 1 Drawing Sheet

DISC BRAKE PRESSURE PLATE WITH ABUTMENT EARS HAVING LATERALLY DISPLACED SECTIONS

TECHNICAL FIELD

This invention relates to the art of disc brakes. In particular, the invention relates to the shape and manufacture of abutment ears on a disc brake pressure plate.

BACKGROUND ART

Disc brakes for vehicles typically include a mounting bracket fixed to the vehicle and a brake pad movably mounted on the bracket for engaging a rotor to create frictional braking forces. The brake pad includes a friction material secured to a metal pressure plate by an adhesive, and the pressure plate is, in turn, mounted on the bracket for movement toward the rotor in response to mechanical or hydraulic forces.

The pressure plate typically has longitudinal projections, or ears, that engage lateral slots in the bracket. The ears slide in the slots toward or away from the rotor as the pressure plate moves in response to application or release of the vehicle's brake mechanism. During application of the brake mechanism, the pressure plates are urged toward the rotor, thus creating braking forces that are transferred to the bracket by the sides of the plates and the ears.

A problem faced in this art arises because a gap must be provided between the rotor and the fixed bracket to allow the rotor to rotate freely in the absence of engagement between the rotor and the friction material. This gap is typically smaller than the combined thickness of the pressure plate and the frictional material but can be larger than the thickness of the pressure plate alone. Thus, when the thickness of the friction material has been reduced substantially, as when it is worn through use over an extended period of time, there is the possibility that the pressure plate can slide out of the slots in the fixed bracket. When this happens, the loose plate will either be thrown out of the brake assembly entirely by the rotating disc or it will become lodged between the bracket and the rotor. Either condition is clearly dangerous.

While this problem can exist in many different types of braking systems, it is more common in those systems that provide a larger tolerance for the position of the rotor, such as brake systems used with a solid rear axle drive system.

One solution to this problem has been to make the pressure plate thicker than the width of the gap, but this requires additional material, adding cost and weight. Another solution has been to bend parts of the ears of the pressure plate to make the ears thicker whereby the combined thickness of the plate and the ears is greater than the width of the gap between the rotor and the bracket. Thus, it has been proposed to bend parts of the ears in a direction away from the friction material such that the bent portions of the ears extend laterally beyond the pressure plate far enough that they remain in the slot even when the pressure plate itself is for the most part beyond the end of the slot and in the gap between the bracket and the rotor.

Significant problems are encountered when increasing the thickness of the ears by bending. One is that the bending requires application of forces to the manufacturing dies that significantly reduces the lifetimes of the dies. Another is that bending changes the shapes of the ears and moves individual parts of the ears into orientations that do not correspond with the orientations of the grooves in the fixed bracket. For example, the tips of ears after bending will lie in planes oriented differently from the planes of the grooves in the fixed housing. Thus, the tips of an ear that have been bent will lie in a plane that is not parallel to the plane containing the bent tips of the ear on the opposite side of the plate. This means that the ears that have been bent must be machined carefully both to reshape them and to make the end surfaces parallel. This requires additional, expensive operations.

Further, if an entire vertical section of the ear is bent laterally, that portion of the ear will then be displaced from the plane of the plate, resulting in application of undesirable torsional forces to the plate.

SUMMARY OF THE INVENTION

In accordance with the invention, the ears of a disc brake pressure plate are provided with sections that have been displaced laterally by the process of stamping, such as fine blanking. Thus, in accordance with the invention, the ears of a disc brake pressure plate are made laterally thicker by displacing sections of the ears only in the lateral direction. This provides several significant advantages.

For example, manufacturing the pressure plate ears by a stamping operation provides a much longer life for the forming dies because the applied forces are aligned with the direction of displacement. Further, the stamping operation is more precise than bending and keeps the end surfaces parallel. Among other advantages, this obviates the requirement to machine the ears after displacement of the sections.

The stamping operation itself employed in the invention is well known to those of skill in the art and generally involves application of a stamping die in the shape of the section to be displaced in a direction directly perpendicular to the plane of the pressure plate. Thus, a flat plate with parallel end surfaces and having the desired profile is placed in the stamping machine, and the selected sections of the ear portions are displaced linearly perpendicular to plate by application of the die. The metal of the plate flows under the force of the stamping dies to provide the desired shape to the ears.

An object of the invention is to provide a disc brake pressure plate having ears with laterally displaced sections.

Another object of the invention is to provide a unique method for making a disc brake pressure plate.

A further object of the invention is to provide a disc brake pressure plate having ears with laterally displaced sections that were formed by stamping.

A still further object of the invention is to provide a disc brake pressure plate having ears with laterally displaced sections formed by fine blanking.

BRIEF DESCRIPTION OF THE DRAWINGS

FIG. 1b is a side elevation view of the pressure plate shown in FIG. 1a.

FIG. 1c is a top plan view of the pressure plate shown in FIG. 1a.

FIG. 2b is a side elevation view of the pressure plate of FIG. 2a.

FIG. 2c is a top plan view of the pressure plate of FIG. 2a.

DETAILED DESCRIPTION OF THE PREFERRED EMBODIMENT

Figure 1A:
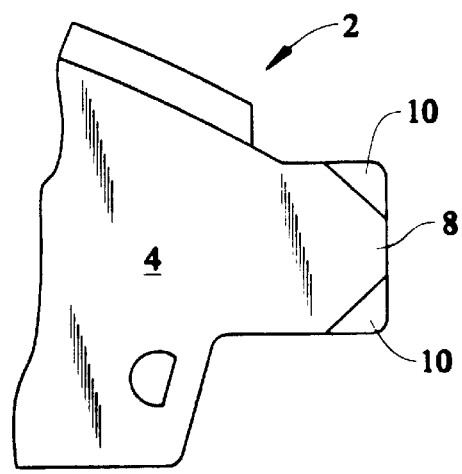
FIG. 1a is a partial front elevation view of a known disc brake pressure plate.
Figure 1B:
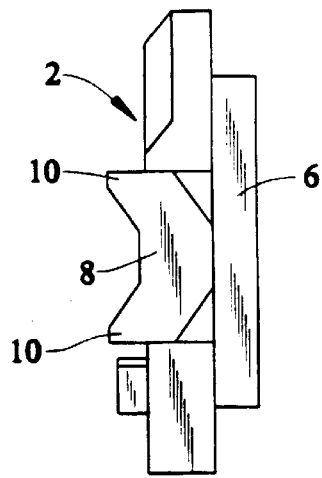
Figure 1C:
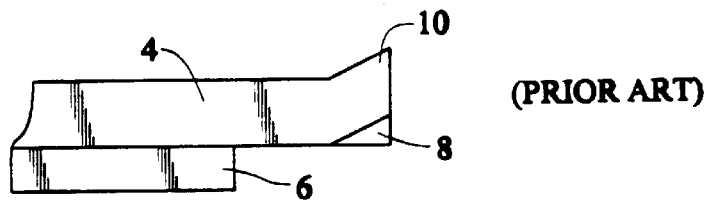

With reference to FIGS. 1a, 1b, and 1c, a disc brake pressure plate 2 that is known in the art includes a first portion 4 adapted to support a friction pad 6. In use, the pressure plate is supported in a fixed bracket (not illustrated) by engagement between ears 8 on the plate in a groove in the fixed bracket. The pressure plate rides in the grooves toward a rotor (not illustrated) upon application of a braking mechanism, either mechanical or hydraulic, and then moves away from the rotor when the braking mechanism is released.

Because it is possible that the pressure plate will be forced out of the groove in the condition when the friction material 6 is worn excessively, the ears 8 are provided with bent portions 10. These bent portions increase the effective width of the ears on the side of the pressure plate opposite the friction pad 6. This increase is such that the overall width of the ear is made greater than the lateral dimension of the gap between the mounting bracket and the rotor such that the ear remains secured in the groove even when the friction pad is worn out.

It is generally desired to manufacture the pressure plate 2 from a flat plate of metal, and the embodiment shown in FIGS. 1a, 1b, and 1c is manufactured by providing a blank of the general shape shown in the figures and then applying a tool to the ear 8 to bend the portions 10. Then, the ends of the ears are machined to provide flat end surfaces parallel to each other for fitting in the groove in the fixed bracket. This process requires re-machining of the blank by a cutter or broaching after the ears have been bent, and is, therefore, both time consuming and expensive.

Figure 2A:
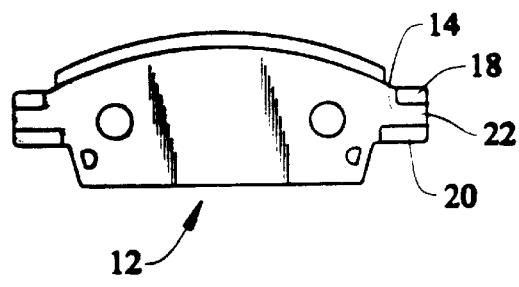
FIG. 2a is a front elevation view of a disc brake pressure plate in accordance with the invention.
Figure 2B:
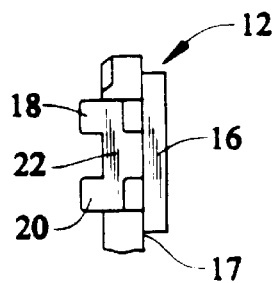
Figure 2C:
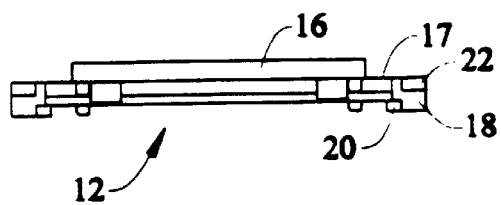

FIGS. 2a, 2b, and 2c illustrate a disc brake pressure plate 12 in accordance with the invention having ears 14 and a friction pad 16 secured to one surface. The ears 14 include laterally displaced sections that have been formed in accordance with one embodiment of the invention.

To make the ears wider laterally, sections 18 and 20 of each ear have been linearly displaced laterally away from the surface 17 supporting the friction pad 16. Section 22 has not been displaced. In the embodiment shown, the plate is about 6.5 mm thick, and sections 18 and 20 have been displaced by about 3.5 mm. The minimum preferred displacement is about 2.5 mm. Section 18 is about 6 mm in height and 8 mm in width. Section 20 is about 6 mm in height and about 13 mm in width. Section 22 is about 5.8 mm in height. It will be appreciated that other dimensions may be used depending on the particular application.

Applicants have found that the amount of the displacement should be about 50% to 75% of the original thickness of the plate to provide the desired increase in thickness while maintaining structural integrity of the ear. Preferably, the displaced sections are rectangular prisms.

In accordance with the invention, sections 18 and 20 are preferably formed by a process known generally as stamping. The sections are stamped from a flat plate with parallel end surfaces in such a manner that each section is moved in a direction substantially perpendicular to the plate so that the section ends remain substantially parallel to each other and are in the proper orientation with reference to the grooves in the fixed bracket. "Substantially parallel" in the context of this application means that the end surfaces are parallel within the tolerances of the grooves in the fixed bracket. Thus, a flat plate having ears with substantially parallel end surfaces is acted on by a stamping tool to displace sections 18 and 20 linearly and perpendicular to the plate. This provides the ears on the stamped plate with displaced sections properly oriented for sliding smoothly in the grooves in the bracket, optimizes the lifetime of the stamping tool, and requires no machining or cutting after forming.

Preferably, a stamping operation known as fine blanking is used, but other processes similar to fine blanking or other types of stamping operations may be used as well.

It will be appreciated that the process of the invention results in a pressure plate of reduced cost and superior performance. Modifications within the scope of the appended claims will be apparent to those of skill in the art.

We claim:

1. A disc brake pressure plate comprising a plate with a longitudinally extending surface adapted to support a friction pad and a longitudinally extending ear adapted to be received in a groove in a mounting bracket, wherein said ear comprises a first section not displaced from said surface and at least one section contiguous to said first section and displaced only in a lateral direction from said first section, said at least one section being a rectangular prism displaced from said surface by 50% to 75% of the thickness of the plate.

2. The disc brake pressure plate according to claim 1 wherein said at least one section comprises two sections on respective, opposite sides of said first section.

3. A method of making a disc brake pressure plate comprising the steps of providing a plate with longitudinally extending ears with substantially parallel end surfaces and forming a laterally displaced section on at least one of said ears by stamping said displaced section only in a lateral direction such that after forming said ears have end surfaces that are substantially parallel, wherein said ears are adapted to ride in a groove in a fixed bracket, said step of stamping comprises fine blanking, and said displaced section is a rectangular prism.

* * * * *